March 11, 1969  YOSHIMITSU UTO ET AL  3,431,949
LAMINATED WALL PRESSURE VESSEL FOR USE IN HYDROGEN ATMOSPHERES
Filed Feb. 28, 1967
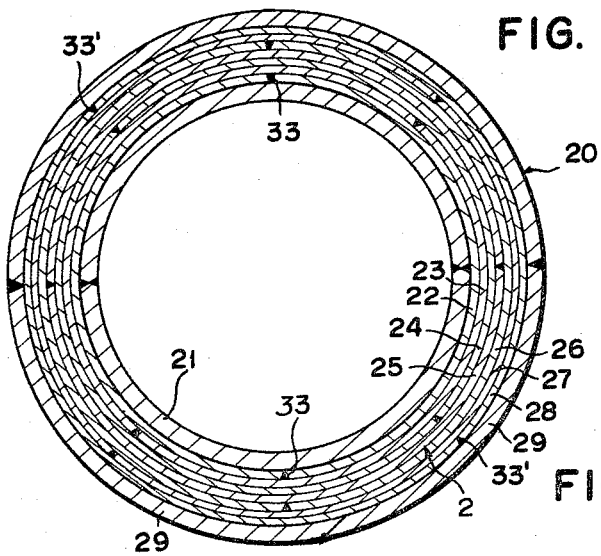
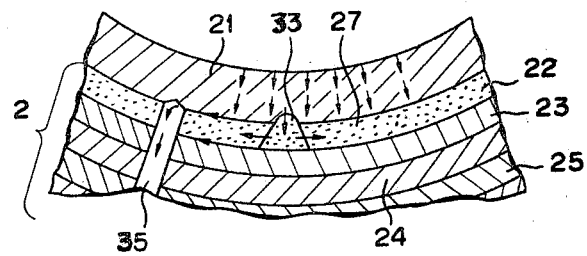
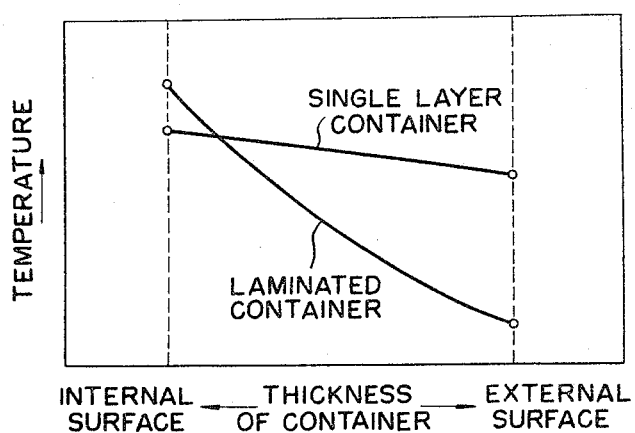
INVENTORS
YOSHIMITSU UTO
TAIZO YAMAZAKI
TOSHIKAZU SHINKAWA
BY
*Mallew & Toren*
ATTORNEYS

United States Patent Office 3,431,949
Patented Mar. 11, 1969

3,431,949
LAMINATED WALL PRESSURE VESSEL FOR USE IN HYDROGEN ATMOSPHERES
Yoshimitsu Uto, Taizo Yamazaki, and Toshikazu Shinkawa, Hiroshima-ken, Japan, assignors to Messrs. Mitsubishi Jukogyo Kabushiki Kaisha, Chiyoda-ku, Tokyo, Japan
Filed Feb. 28, 1967, Ser. No. 619,318
U.S. Cl. 138—143
Int. Cl. F16l 9/14; F25j 1/00
4 Claims

ABSTRACT OF THE DISCLOSURE

A laminated pressure vessel is formed with inner and outer concentric walls between which is positioned a laminate of plurality of cylindrical plates or a laminate from a single spirally wound plate which is successively built up from the inner cylinder to the outer cylinder. The plates are applied and secured by means of longitudinally extending welds and a detection bore extends radially from the unexposed surface of the wall of the vessel which is to be exposed to hydrogen inwardly or outwardly through the laminate to the opposite side of the vessel. Either the inner or the outer cylinder of the vessel, whichever is to be exposed to the hydrogen atmosphere, is made of a steel which is resistant to hydrogen embrittlement, and in addition at least one layer of the laminate adjacent the wall which is to be exposed to the hydrogen and the weld deposit is also made of a steel resistant to hydrogen embrittlement.

Brief summary of the invention

This invention relates in general to the construction of pressure vessels or containers and in particular to a new and useful pressure vessel which is designed to be exposed either on its exterior or interior to a hydrogen atmosphere at elevated pressures and temperatures.

Hydrogen embrittlement of pressure containers is apt to occur on the portion of the wall of the container which is subjected to the hydrogen gas at high pressure or high temperature. Such embrittlement can be precluded if all of the material employed in fabricating the vessel is made of a hydrogen-resistant alloy steel which is capable of resisting attacks by the hydrogen gas. However, such hydrogen-resistant steel is expensive to manufacture and requires great technical skill and expenditure in the heat treatment, welding and other working which results in an increased manufacturing cost for the vessel.

In accordance with the present invention it has been found that the cost for such vessels can be materially reduced by making the wall of such vessel which is exposed to the hydrogen atmosphere and a laminate immediately surrounding the wall or interiorly of the wall of a material which is resistant to hydrogen attack. The remainder of the vessel may be made of a relatively inexpensive steel material.

Accordingly, it is an object of the invention to provide an improved pressure vessel construction made of a plurality of laminated plates disposed between an interior and exterior wall with the wall adjacent the side of the vessel exposed to a hydrogen atmosphere and the next adjacent laminate layer, including its seam welds, being made of a hydrogen-resistant material.

A further object of the invention is to provide a vessel which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which there is illustrated and described a preferred embodiment of the invention.

Brief description of the drawings

In the drawings:
FIG. 1 is a cross sectional view of a laminated high pressure container which may be subjected to a hydrogen atmosphere on either the interior or exterior or both and which is constructed in accordance with the invention;

FIG. 2 is an enlarged partial sectional view of the inner portion of the vessel of a type indicated in FIG. 1 where the interior is subjected to a hydrogen atmosphere, the construction being reversed when the exterior is to be subjected to the hydrogen atmosphere; and FIG. 3 is a diagram showing the temperature distribution over the inner wall of a laminated high pressure container.

Detailed description

Referring to the drawings in particular, the invention embodied therein as indicated in FIGS. 1 and 2 comprises a pressure vessel generally designated 20 which is formed by an inner cylinder 21 and an outer cylinder or plate assembly 29. The inner cylinder 21 and the outer cylinder 29 are advantageously formed by a plurality of curved plate elements which are joined together by welds which are concentrically arranged and between which is located a laminate generally designated 2 made up of a plurality of or composite plate layers 22 to 28 inclusive which are of a number and thickness to fill the space between the inner cylinder 21 and the exterior cylinder 29. In the embodiment illustrated, separate plate layers are each formed of a plurality of curved plates which are wrapped around the inner cylinder 21 and welded at radially spaced locations along longitudinally extending weld seams 33. Successive layers are welded along weld seams which are offset from the next adjacent plate. It should be appreciated, however, that a single spirally wound plate may be formed into the plurality of layers over the inner cylinder by winding in a spiral manner to the outer cylinder in which event a spiral weld would be required.

A detection or pressure equalizing hole 35 is drilled through the exterior cylinder 29 and through the laminate 2 to the exterior surface of the inner cylinder 21 which is exposed on its interior surface to a hydrogen atmosphere. This hole 35 permits a flow of gas through the laminate and the exterior cylinder 29 so that it can be detected on the exterior of the vessel. Part of the hydrogen gas is absorbed from the surface of the steel forming the inner cylinder of the container and is diffused into the steel as indicated by the arrows in FIG. 2. The hydrogen absorbed from the surface of the inner cylinder 21 penetrates the inner cylinder wall and precipitates in the space between the inner cylinder 21 and the laminate plate 22 adjacent the inner cylinder. The gas then flows out of the container through the detection hole 35. The hole 35 prevents the pressure in the interior space of the vessel from rising above atmospheric pressure and therefore the laminate plate 22 will not become embrittled by the hydrogen. On the other hand, the deposited metal 33 of the weld tends to be attacked by hydrogen because it is welded with the inner cylinder 21 to form a unitary structure and hydrogen diffuses from the inner cylinder 21 into the deposited metal 33 and the laminate plate 22 which is in the vicinity of the weld.

In order to overcome these efforts in accordance with the invention, the laminate plate 22 adjacent the inner cylinder and the deposited metal 33 thereon are both made of a hydrogen-resistant steel. With such a construction the laminate plate 22 will not become subjected to hydrogen embrittlement even though hydrogen has penetrated the inner cylinder 21 and through the deposited metal 33 and then diffuses in the lamina plate 22 therearound. Any hydrogen gas which penetrates through the lamina plate 22 and the deposited metal 33 will precipitate to a space between the former two and a lamina plate 23 and flows out of the container through the hole 35. Because the hydrogen is permitted to flow in this manner, the pressure in the space is prevented from rising above atmospheric pressure and there will be no danger that the laminate 23 becomes embrittled by hydrogen.

In the embodiment of the invention where the laminate 2 is formed by a spirally wound continuous plate, a welded joint which is formed at the initial winding end of the spirally wound plate and the inner cylinder is formed of a hydrogen-resistant material.

Although the term "carbon steel" has been used herein merely for simplicity of description, the term is meant to designate a steel which has been manufactured without a consideration for hydrogen resistance characteristics. It therefore is not limited to pure carbon steel but may include low alloy steel and high tension steel. In addition, the term "hydrogen-resistant steel," as used herein, means steel made by adding not less than from 0.1% chromium and/or molybdenum and one or more of other given elements to steel in order to prevent or minimize impairment of the steel due to contact with hydrogen at elevated pressures and temperatures.

The vessel 20 has been described as one in which the hydrogen atmosphere is located at the interior of the vessel adjacent the inner wall 21. In the event that the hydrogen is to be located on the exterior adjacent the outer plate 29, the next inner plate 28, together with the welds 33', will all be made of a material which is resistant to hydrogen. With such an arrangement a detection hole or pressure-equalizing hole will extend from the inner surface of the outer cylinder 29 through the laminate 2 and the inner cylinder 21.

The construction of the invention makes it possible to make most of the laminate 2 of plates which are relatively inexpensive and not manufactured specifically for their hydrogen resistance characteristics.

While a specific embodiment of the invention has been shown and described in detail to illustrate the application of the inventive principles, it will be understood that the invention may be embodied otherwise without departing from such principles.

What is claimed is:

1. A pressure vessel for use in association with a hydrogen under elevated pressure and temperature comprising an inner cylinder, an outer cylinder concentrically arranged around said inner cylinder, a laminate of a plurality of layers of plates disposed between said inner and outer cylinders, at least the layers of said plates adjacent said inner and outer cylinders being joined at least along one seam by a weld of deposited metal, the exposed surface of at least one of said inner and outer cylinders being adapted to be subjected to a hydrogen atmosphere, a pressure equalizing bore extending radially through the laminate and the wall of the one of said inner and outer cylinder which is opposite to the one adapted to be exposed to hydrogen under pressure to permit equalizing flow of the hydrogen through the bore, the one of said inner and outer cylinders which is adapted to be exposed to hydrogen under pressure and high temperature together with the plate layer adjacent thereto and the deposit of weld material of said layer all being made of a steel resistant to hydrogen embrittlement.

2. A pressure vessel according to claim 1, wherein said laminate layers are each formed by a plurality of curved plates which are joined together by welds which extend longitudinally of the vessel.

3. A pressure vessel according to claim 1, wherein said inner and outer cylinders are formed by a plurality of curved plate elements which are joined together by welds which extend longitudinally and are located at a plurality of radially spaced locations.

4. A pressure vessel according to claim 1, wherein said inner cylinder surrounds the hydrogen under pressure and high temperature, said inner cylinder being formed of a plurality of plates joined together by a plurality of longitudinally extending welds of deposited metal, said laminate including a layer of a plurality of plates joined together by a plurality of longitudinally extending welds adjacent said inner cylinder, and wherein said laminate adjacent said inner cylinder, said inner cylinder and all of said well holding said inner cylinder and said laminate adjacent said inner cylinder together being formed of a material which is resistant to hydrogen embrittlement.

References Cited
UNITED STATES PATENTS

| 3,224,619 | 12/1965 | Maurin et al. | 220—3 |
| 3,231,338 | 1/1966 | Andrus | 220—3 X |
| 3,268,103 | 8/1966 | Nelson | 220—3 |

LOUIS K. RIMRODT, *Primary Examiner.*

U.S. Cl. X.R.

220—3